(12) United States Patent
Takewaki et al.

(10) Patent No.: US 9,297,433 B2
(45) Date of Patent: Mar. 29, 2016

(54) ELECTRIC PARKING BRAKE DRIVING DEVICE AND ELECTRIC PARKING BRAKE DEVICE

(75) Inventors: Morimasa Takewaki, Nagoya (JP); Yuichi Takeo, Chita-gun (JP); Kosuke Sakai, Okazaki (JP); Masakazu Ozawa, Aichi-gun (JP); Katsuhiko Takasu, Nishio (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/113,504

(22) PCT Filed: Apr. 23, 2012

(86) PCT No.: PCT/JP2012/060853
§ 371 (c)(1),
(2), (4) Date: Oct. 23, 2013

(87) PCT Pub. No.: WO2012/147689
PCT Pub. Date: Nov. 1, 2012

(65) Prior Publication Data
US 2014/0041975 A1    Feb. 13, 2014

(30) Foreign Application Priority Data
Apr. 26, 2011 (JP) ................................. 2011-098015

(51) Int. Cl.
*F16D 65/00* (2006.01)
*F16D 65/18* (2006.01)
(Continued)

(52) U.S. Cl.
CPC ............. *F16D 65/18* (2013.01); *F16D 55/225* (2013.01); *F16D 2055/0004* (2013.01); *F16D 2125/50* (2013.01); *F16H 2025/2081* (2013.01); *F16H 2025/2087* (2013.01)

(58) Field of Classification Search
CPC ............... F16D 2055/0004; F16D 2055/0008; F16D 2055/002; F16D 55/08; F16D 63/002; F16D 65/0075; F16D 65/14; F16D 65/18; F16D 2121/24; F16D 2125/20; F16D 2125/40; F16D 2125/50; F16D 2129/04; F16D 2129/10; F16D 2131/00; F16D 2500/108

USPC ............. 188/72.1, 72.7, 72.8, 73.1, 156, 157, 188/158; 74/424.92; 475/149
See application file for complete search history.

(56) References Cited

U.S. PATENT DOCUMENTS 4,804,073 A * 2/1989 Taig et al. ..................... 188/72.1
4,865,162 A * 9/1989 Morris et al. ................. 188/72.8
(Continued)

FOREIGN PATENT DOCUMENTS

CN       101194408 A    6/2008
JP    2004-218714 A    8/2004
(Continued)

OTHER PUBLICATIONS

International Search Report (PCT/ISA/210) mailed on Jul. 17, 2012, by the Japanese Patent Office as the International Searching Authority for International Application No. PCT/JP2012/060853.
(Continued)

*Primary Examiner* — Melody Burch
(74) *Attorney, Agent, or Firm* — Buchanan Ingersoll & Rooney PC

(57) ABSTRACT

A parking brake actuator generates and applies a braking force to a vehicle wheel by converting a rotation movement of a screw member which is rotated by an electric parking brake driving device into a translatory movement and transmitting the converted translatory movement to a piston to push a brake pad to a disc by the piston. The electric parking brake driving device includes an electric motor and a reduction gear mechanism which transmits the driving force of the electric motor to the electric parking brake driving device. The reduction gear mechanism includes a pinion gear fixed to an output shaft of the electric motor, a first gear shaft rotatably supported on a first bearing member provided on a gear body and a first wheel gear formed on the first gear shaft and engaging the first wheel gear to thereby reduce the speed of driving force of the electric motor.

4 Claims, 6 Drawing Sheets

(51) Int. Cl.
  *F16D 55/225* (2006.01)
  *F16D 55/08* (2006.01)
  *F16D 55/00* (2006.01)
  *F16H 25/20* (2006.01)
  *F16D 125/50* (2012.01)

(56) References Cited

U.S. PATENT DOCUMENTS

| | | | | |
|---|---|---|---|---|
| 6,059,679 | A * | 5/2000 | Tsutsui et al. | 474/135 |
| 6,536,561 | B1 * | 3/2003 | Keller | 188/71.8 |
| 6,554,109 | B1 * | 4/2003 | Olschewski et al. | 188/72.8 |
| 8,579,090 | B2 * | 11/2013 | Yamasaki | 188/72.8 |
| 2006/0180413 | A1 | 8/2006 | Halasy-Wimmer et al. | |
| 2007/0049453 | A1 | 3/2007 | Nagai et al. | |
| 2009/0050420 | A1 | 2/2009 | Poertzgen | |
| 2009/0095579 | A1 | 4/2009 | Yamasaki | |
| 2009/0255769 | A1 * | 10/2009 | Kurita | 188/370 |
| 2010/0108450 | A1 * | 5/2010 | Suckfull et al. | 188/196 R |
| 2010/0320043 | A1 * | 12/2010 | Yamasaki et al. | 188/162 |
| 2012/0073393 | A1 | 3/2012 | Yamasaki | |

FOREIGN PATENT DOCUMENTS

| | | |
|---|---|---|
| JP | 2006-520453 A | 9/2006 |
| JP | 2007-092982 A | 4/2007 |
| JP | 2008-164111 A | 7/2008 |
| WO | WO 2007/096098 A1 | 8/2007 |

OTHER PUBLICATIONS

Informal Comment on Written Opinion of the International Searching Authoritydated Sep. 13, 2012 and English Translation of the Informal Comment.
Chinese Office Action dated May 6, 2015 issued in the corresponding Chinese Patent Application No. 201280018993.4 (8 pages).

* cited by examiner

ELECTRIC PARKING BRAKE DRIVING DEVICE AND ELECTRIC PARKING BRAKE DEVICE

TECHNICAL FIELD

This invention relates to an electric parking brake driving device and an electric parking brake device for applying braking force to a vehicle wheel by driving an electric motor upon vehicle parking.

BACKGROUND OF THE TECHNOLOGY

A conventional electric brake device has been known, which is installed in a vehicle wheel and applies braking force to the vehicle wheel by operating an electric motor (for example, see patent document 1). The electric brake device disclosed in the patent document 1 is formed by a small diameter pulley fixed to an output shaft of an electric motor and a large diameter pulley rotatably attached to a body and on which a belt is mounted over onto the small diameter pulley. The large diameter pulley is connected to a two-stage planetary gear set on the common rotation axis and a gear mechanism is formed thereon together with the large diameter pulley.

According to thus structured electric brake device, the driving force of the electric motor is transmitted and rotation speed thereof is decelerated by the transmitting mechanism including the belt and a plural stage planetary gear set and is converted into a translatory movement which is transmitted to a wheel brake device to apply braking force thereto. As explained, since the electric brake device disclosed in the patent document 1 uses a power transmitting mechanism including a belt, the layout of rotation shaft for a gear mechanism is freely designed and the brake device can be easily installed into the vehicle.

DOCUMENT LIST OF STATE OF ART

Patent Document

Patent Document 1: WO2007/096098 A (pamphlet)

DISCLOSURE OF INVENTION

Problems to be Solved

However, on the other hand, the electric brake device disclosed in the patent document 1 uses belt type power transmitting mechanism and accordingly, it is necessary to devise a supporting means for supporting a rotation shaft of gear mechanism. Generally, when the rotation shaft of the gear mechanism is supported through a bearing provided on a body portion, the position of the rotation shaft of the gear mechanism relative to the output shaft of the electric motor may be deviated. Particularly, when the body is formed by connecting a pair of body members through vibration welding or the like and attaching an electric motor to one of the pair of body members and attaching the rotation shaft of the gear mechanism to the other of the pair of body members, the position of the rotation shaft of the gear mechanism relative to the electric motor is largely deviated.

As explained above, since a belt is interposed between the small diameter pulley and the large diameter pulley according to the electric brake device disclosed in the patent document 1, position deviation of the rotation shaft of the gear mechanism relative to the electric motor may lead to a shortage of belt tension or an excessive tension. When the belt tension is not appropriately applied, transmission of the driving force from the electric motor may create problems. For example, if a large torque is transmitted, a slipping may occur on the belt.

In order to prevent occurrence of such problems, a spacer having a high rigidity is interposed between the rotation shaft of the gear mechanism and the electric motor of the electric brake device disclosed in the patent document 1 and the rotation shaft of the gear mechanism is attached relative to the electric motor. Thus, the rotation shaft is not directly attached to the body and the positioning of the rotation shaft of the gear mechanism relative to the output shaft of the electric motor can be carried out accurately.

However, according to the above means, it is necessary to add a spacer which may lead to oversizing of the electric brake device as a whole and accordingly overweighting issue arises. As explained, a spacer is interposed between the electric motor and the rotation shaft, a large space is needed in the body to restrict the degree of freedom for positioning of other components and accordingly, such restriction of degree of freedom may lead to a cost increase of manufacturing the electric brake device.

Further, since the rotation shaft is positioned by the spacer relative to the electric motor, a predetermined gap is provided between the spacer and the body. Accordingly, such gap may also lead to oversizing of the electric brake device. The present invention was made considering the above issues and it is an object of the invention to provide an electric parking brake driving device and an electric parking brake device with compact in size and low in cost.

Means for Solving the Problem

In order to solve the above problems, the structure of the invention according to a first aspect is characterized in that an electric parking brake driving device for driving a parking brake actuator which generates a braking force and applies the braking force to a vehicle wheel by converting a rotational movement from a rotating member into a translatory movement, transmitting the converted translatory movement to a piston and by pushing a rotating disc rotated together with the vehicle wheel by a brake pad biased by the piston, the electric parking brake driving device comprising an electric motor and a reduction gear mechanism for transmitting a driving force of the electric motor to the rotating member, wherein the reduction gear mechanism includes a gear body, a drive gear provided in the gear body and fixed to an output shaft of the electric motor, a first rotating shaft rotatably supported on the gear body through a first bearing portion provided on the gear body, a first driven gear formed on the first rotating shaft and having a plurality of gear teeth more than a number of gear teeth formed on the drive gear.

The feature in structure of the invention according to the first aspect is further characterized in that the reduction gear mechanism further includes a transmitting gear formed on the first rotating shaft and integrally rotating with the first driven gear, a second rotating shaft rotatably supported on the gear body through a second bearing portion provided on the gear body, a second driven gear formed on the second rotating shaft and having a plurality of gear teeth more than a number of gear teeth formed on the transmitting gear, whereby the second driven gear engages with the transmitting gear, a sun gear provided on the second rotating shaft and integrally rotating with the second driven gear, a plurality of planetary gears engaging with the sun gear and orbiting around an outer periphery of the sun gear in response to the rotation of the sun gear, a ring gear disposed around the planetary gears and engaging therewith at an inner peripheral surface, whereby the rotation of the ring gear is restricted by engaging with the gear body and a carrier member connecting the plurality of planetary gears and connected to the rotating member to be rotated by the orbiting of the planetary gears, whereby the rotation of the sun gear is outputted to the rotating member through a reduction.

The feature in structure of the invention according to a second aspect is characterized in that the gear body is provided with the second bearing portion which includes a pair of second bearing portions and the gear body includes a supporting wall which extends from an outer wall towards a rotation center of the second rotating shaft and separating the planetary gears from the second driven gear, and wherein one of the pair of second bearing portions is formed on the supporting wall.

The feature in structure of the invention according to a third aspect is characterized in that the gear body is formed by a pair of body pieces which is connected with each other so that a space with a predetermined volume is provided inside the gear body, and wherein the pair of body pieces is connected at each outer peripheral brim thereof by an adhesive agent.

The feature in structure of the invention according to a fourth aspect is characterized in that the gear body is formed by a pair of body pieces which is connected with each other so that a space with a predetermined volume is provided inside the gear body, both of the pair of body pieces are formed by a thermoplastic synthetic resin material, and wherein the two body pieces are connected by contacting respective outer peripheral brim portions with each other, placing a linear shaped heating element between the respective outer peripheral brim portions and under developing heat by energizing the heating element, connecting the both body pieces by applying pressure to each other by welding.

The feature in structure of the invention according to a fifth aspect is characterized in that the electric parking brake device comprises a brake housing attached to a vehicle body, a piston attached to and displaceable relative to the brake housing, a brake pad disposed between a disc which rotates with a vehicle wheel and the piston, an electric motor provided to be non-displaceable relative to the brake housing, a reduction gear mechanism for transmitting a driving force of the electric motor, a rotating member driven by the electric motor within the brake housing through the reduction gear mechanism and a translatory member engaging with the rotating member and non-rotatable relative to the brake housing but displaceable in an axial direction of the piston by the rotation of the rotating member for biasing the brake pad towards the disc through the piston, wherein the reduction gear mechanism includes a gear body attached to the brake housing, a drive gear provided in the gear body and fixed to an output shaft of the electric motor, a first rotating shaft rotatably supported on the gear body through a first bearing portion provided on the gear body, a first driven gear formed on the first rotating shaft and having a plurality of gear teeth more than a number of gear teeth formed on the drive gear, a transmitting gear formed on the first rotating shaft and integrally rotating with the first driven gear, a second rotating shaft rotatably supported on the gear body through a second bearing portion provided on the gear body, a second driven gear formed on the second rotating shaft and having a plurality of gear teeth more than a number of gear teeth formed on the transmitting gear, whereby the second driven gear engages with the transmitting gear; a sun gear provided on the second rotating shaft and integrally rotating with the second driven gear; a plurality of planetary gears engaging with the sun gear and orbiting an outer periphery of the sun gear in response to the rotation of the sun gear, a ring gear disposed around the planetary gears and engaging with the planetary gears at an inner peripheral surface, whereby the rotation of the ring gear is restricted by engaging with the gear body and a carrier member connecting the plurality of planetary gears and connected to the rotating member to be rotated by an orbiting of the planetary gears, whereby a rotation of the sun gear is outputted to the rotating member through a reduction whereby the first driven gear engages with the drive gear so that the rotation of the electric motor is outputted to the rotating member through a reduction.

The Effects of the Invention

According to the electric parking brake driving device according to the first aspect, the first rotating shaft is supported by the first bearing portion provided at the gear body and no spacer or the like is needed for supporting the first rotating shaft to the electric motor. This structure can avoid oversizing of the reduction gear mechanism, which leads to manufacturing of a cost reduced electric parking brake driving device. Further, since the gear reduction mechanism includes a drive gear fixed to the output shaft of the electric motor and a first driven gear having the number of teeth being more than the number of teeth of the drive gear and engaging with the drive gear, no transmitting mechanism with belt is needed for transmitting the rotation torque from the electric motor to the rotating member by reduction of rotation speed. Further, even if the position of the first rotating shaft relative to the electric motor is deviated, the driving force from the electric motor can be surely transmitted to be able to reliably park the vehicle without any problem.

According to the electric parking brake driving device according to the first aspect, the reduction gear mechanism further includes a transmitting gear formed on the first rotating shaft and integrally rotating with the first driven gear, a second rotating shaft rotatably supported on the gear body through a second bearing portion provided on the gear body, a second driven gear formed on the second rotating shaft and having a plurality of gear teeth more than a number of gear teeth formed on the transmitting gear, whereby the second driven gear engages with the transmitting gear, a sun gear provided on the second rotating shaft and integrally rotating with the second driven gear, a plurality of planetary gears engaging with the sun gear and orbiting an outer periphery of the sun gear in response to the rotation of the sun gear, a ring gear disposed around the planetary gears and engaging with the planetary gears at an inner peripheral surface, whereby the rotation of the ring gear is restricted by engaging with the gear body and a carrier member connecting the plurality of planetary gears and connected to the rotating member to be rotated by an orbiting of the planetary gears, whereby the rotation of the sun gear is outputted to the rotating member through reduction. Accordingly, the rotation speed of the motor is reduced by the two-stage gear mechanism and the planetary gear mechanism to be able to provide an electric parking brake driving device with a small size, but having a large reduction effect.

According to the electric parking brake driving device according to the second aspect, one of the pair of second bearing portions is formed on the supporting wall which extends from an outer wall towards a rotation center of the second rotating shaft. Accordingly, the second rotating shaft can be positioned at any desired position in an axial direction thereof. Further, the supporting wall separates the planetary gears from the second driven gear and accordingly a heat transmission or water invasion from the brake pad side into the gear body inside can be prevented.

According to the electric parking brake driving device according to the third aspect, the pair of body pieces is connected at each outer peripheral brim thereof by an adhesive agent. Accordingly, the gear body is quickly formed within a short period of time by connecting the body pieces.

According to the electric parking brake driving device according to the fourth aspect, both of the pair of body pieces are formed by a thermoplastic synthetic resin material, and wherein the two body pieces are connected by contacting respective outer peripheral brim portions with each other, placing a linear shaped heating element between the respective outer peripheral brim portions and under developing fever by energizing the heating element, welding the both body pieces by applying pressure to each other for welding. Accordingly, the gear body is quickly formed by connecting the body pieces without applying any adhesive agent on the body pieces or without necessitating the time for waiting the adhesive agent to be solidified.

According to the electric parking brake device according to the fifth aspect, the first rotating shaft is supported by the first bearing portion provided at the gear body and no spacer or the like is needed for supporting the first rotating shaft to the electric motor. This structure can avoid oversizing of the reduction gear mechanism, which leads to manufacturing of a cost reduced electric parking brake device. Further, since the gear reduction mechanism includes a drive gear fixed to the output shaft of the electric motor and a first driven gear having the number of teeth being more than the number of teeth of the drive gear and engaging with the drive gear, no transmitting mechanism with belt is needed for transmitting the rotation torque from the electric motor to the rotating member by reduction of rotation speed. Further, even if the position of the first rotating shaft relative to the electric motor is deviated, the driving force from the electric motor can be surely transmitted without any problem.

BRIEF EXPLANATION OF ATTACHED DRAWINGS

THE EMBODIMENTS FOR IMPLEMENTING THE INVENTION

1) First Embodiment

Figure 1:
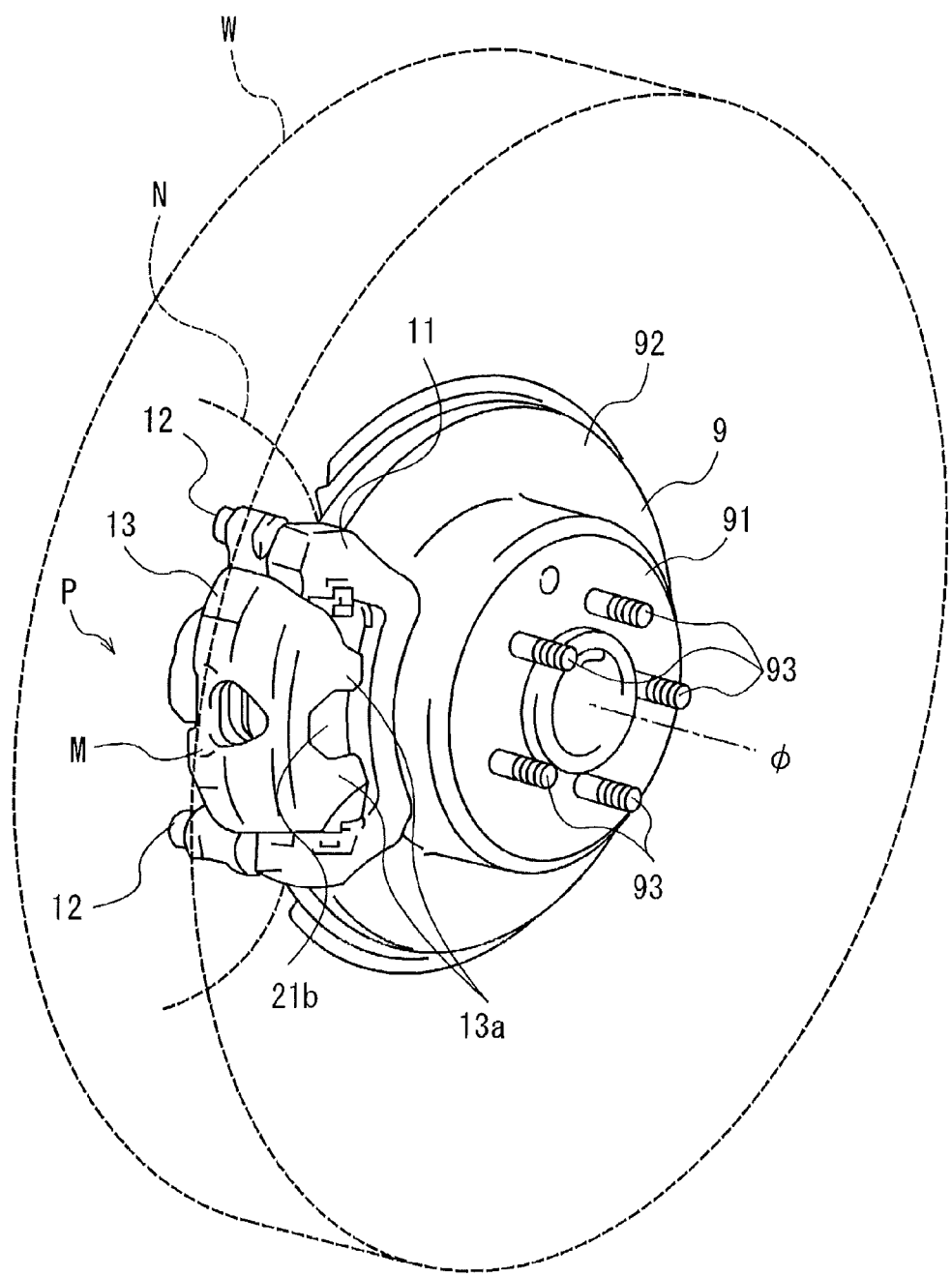
FIG. 1 is an outer perspective view of an electric parking brake device according to a first embodiment of the invention showing a state that the electric parking brake device is engaged with the disc rotor.
Figure 2:
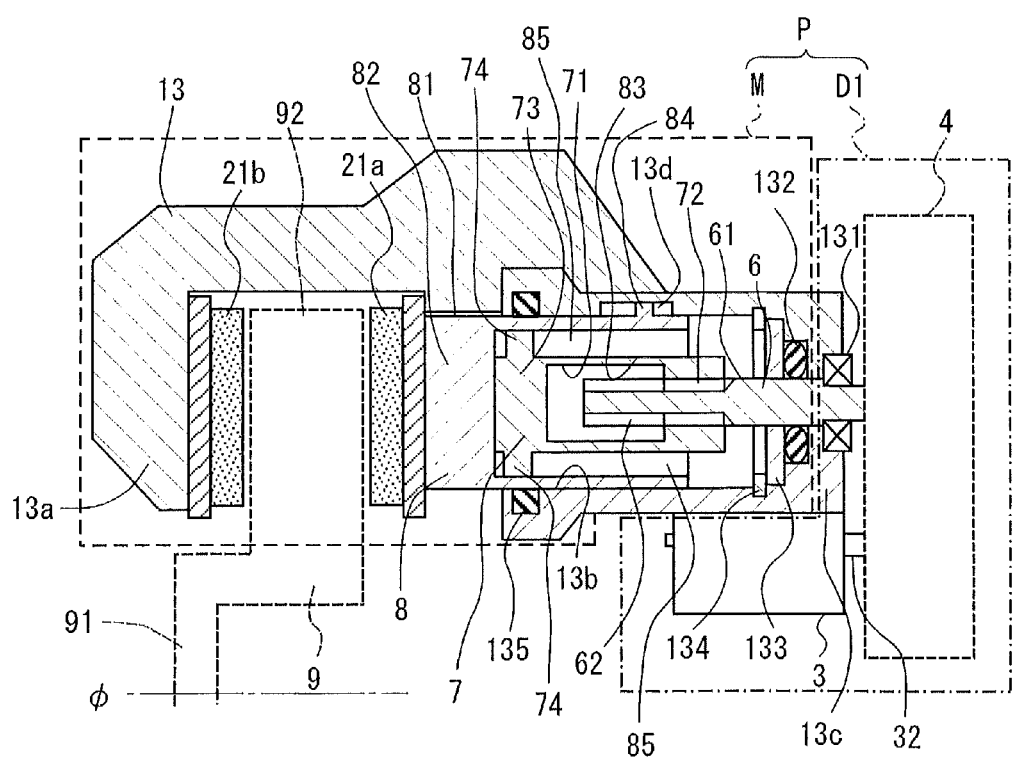
FIG. 2 is a cross sectional view schematically illustrating the electric parking brake device shown in FIG. 1 to be cut in a rotating axis direction of the disc rotor.

The electric parking brake device P according to the first embodiment will be explained with reference to FIGS. 1 through 5 of the attached drawings. The electric parking brake device P according to this embodiment is commonly used as a foot brake device which applies a braking force to a vehicle wheel W by a brake operating member operated by the driver of the vehicle during the vehicle running. It is noted here that the up-down direction in FIG. 3 corresponds to a direction of rotation axis φ of the disc rotor 9. Further it is noted that FIG. 2 is a schematically illustrated view of the electric parking brake device P and is not an accurately illustrated cross section view of an actual device.

The disc rotor 9 (corresponding to a disc of the invention), which is not a structural element of the invention, includes a but portion 91 projecting outside of the vehicle from the rotation center φ and a plate portion 92 formed around the periphery of the but portion 91 and is squeezed by a first brake pad 21*a* and a second brake pad 21*b*, the operation thereof will be explained later. As shown in FIG. 1, a plurality of stud bolts 93 is projecting from an end surface of the but portion 91. The disc rotor 9 is attached to a disc wheel of the vehicle wheel W by the stud bolts 93 for unitary rotation with the vehicle wheel W.

A mounting 11 of the electric parking brake device P is attached to and fixed to a knuckle arm N (corresponding to a vehicle body of the invention). The first and the second brake pads 21*a* and 21*b* are supported by the mounting 11 (FIG. 1 shows only the second brake pad 21*b*). The first brake pad 21*a* is disposed between the disc rotor 9 and a later explained piston 8.

A brake housing 13 is attached to the mounting 11 through a pair of slide pins 12 and movable in a rotation axis φ direction (hereinafter referred to as "rotation axis direction"). The brake housing 13 is formed to bridge over the plate portion 92 of the rotor 9 and is shaped to be of approximately a reversed C-shape (FIGS. 1 and 2). A pair of claw portions 13*a* is provided on the brake housing 13 for pushing the second brake pad 21*b*.

As shown in FIG. 2, an electric parking brake driving device D1 is attached to the brake housing 13 and includes an electric motor 3 and a reduction gear mechanism 4 therein. The detail of the electric parking brake driving device D1 will be explained later. A cylinder portion 13*b* is formed inside of the brake housing 13 and a screw member 6 (corresponding to a rotating member of the invention) is provided and projecting into the inside of the cylinder portion 13*b*. The screw member 6 is extending in a rotation axis direction and rotatably attached to a bottom portion 13*c* of the cylinder portion 13*b* through a bearing 131. A sealing member 132 is interposed between an outer peripheral surface 61 of the screw member 6 and the bottom portion 13*c*. The sealing member 132 is formed by a resin material or a synthetic rubber material.

In order to prevent the sealing member 132 from movement in a rotation axis direction, a presser plate 133 is provided at the bottom portion 13*c* of the cylinder portion 13*b*. Further, a snap ring 134 is provided on an inner peripheral surface of the cylinder portion 13*b* to retain the presser plate 133 not to be loosened. A nut member 7 (corresponding to a translatory member of the invention) is provided within the cylinder portion 13b so that the screw member 6 is positioned radially outwardly relative to the screw member 6. The nut member 7 is of approximately a cylindrical shape and an end portion in an axial direction of an inner peripheral surface 71 is formed with a female screw portion 72. The female screw portion 72 of the nut member 7 is engaged with a male screw portion 62 formed on the outer peripheral surface 61 of the screw member 6. The other end portion 73 in the axial direction of the nut member 7 is formed with a plurality of engaging portions 74 extending from the outer peripheral surface in the radially outward direction. The piston 8 is movably inserted into the cylinder portion 14b in a rotation axis direction and a piston seal 135 is provided on the cylinder portion 13b so that the piston seal 135 engages with an outer peripheral surface 81 of the piston 8. The piston seal 135, together with the sealing member 132, liquid-tightly seal the inside of the cylinder portion 13b from the outside.

The piston 8 is formed of an approximately cylindrical shape one end of which is closed by an end wall 82 and the other end of which is engageable with the first brake pad 21a by the end wall 82. The nut member 7 is relatively movably engaged with an inner peripheral surface 83 of the piston 8 relative to the piston 8 in a rotation axis direction. A projection 84 is provided on the outer peripheral surface 81 of the piston 8 and a slit 13d is provided on the cylinder portion 13b extending in a rotation axis direction. The projection 84 of the piston 8 and the slit 13d are engaged to prevent the piston 8 from rotating relative to the cylinder 13b.

On the other hand, an inner peripheral surface 83 of the piston 8 is provided with a plurality of slide grooves 85 extending in a rotation axis direction and the plurality of engaging portions 74 of the nut member 7 is inserted into the plurality of slide grooves 85. Accordingly, the nut member 7 is prevented from the rotation relative to the piston 8. Thus, the nut member 7 is formed to be non-rotatable relative to the cylinder portion 13b through the piston 8.

The screw member 6 is formed to be rotated by the electric motor 3 through the reduction gear mechanism 4. When the screw member 6 is rotated while the vehicle is parked, the non-rotatable nut member 7 is moved within the piston 8 towards the disc rotor 9 in a rotation axis direction (to the left as viewed in FIG. 2). Then the end portion 73 of the nut member 7 pushes the piston 8 and biases the first brake pad 21a towards the disc rotor 9.

On the other hand, the reaction force generated at the first brake pad 21a is applied on the brake housing 13 through the piston 8, nut member 7, screw member 6 and the reduction gear mechanism 4 thereby biasing the brake housing 13 in an opposite direction to the piston 8 (to the right as viewed in FIG. 2). The brake housing 13 is moved in the rotation axis direction and the claw portions 13a bias the second brake pad 21b towards the disc rotor 9. Thus, the disc rotor 9 is squeezed between the first and the second brake pads 21a and 21b to apply braking force to the vehicle wheel W.

When the braking force applied to the disc rotor 9 is desired to be released, the electric motor 3 is actuated to be rotated in the reverse direction. The nut member 7 is moved to the right as viewed in FIG. 2 and the pushing of the first brake pad 21a by the piston 8 is stopped. Then the reaction force generated at the first brake pad 21a is diminished and eventually finishes. Then the pushing of the claw portions 13a of the brake housing 13 against the second brake pad 21b is also stopped to release the braking force applied to the vehicle wheel W.

When a driver of the vehicle operates braking operation to decelerate the vehicle speed, while the vehicle is running, the hydraulic brake pressure from a master cylinder (not shown) is supplied into the cylinder portion 13b via a brake conduit (not shown). The brake pressure supplied to the cylinder portion 13b pushes the piston 8 which has been separated from the nut member 7 in the rotation axis direction (to the left as viewed in FIG. 2) to bias the first brake pad 21a towards the disc rotor 9. The parking brake actuator M is formed by the mounting 11, slide pins 12, brake housing 13, first brake pad 21a, second brake pad 21b, screw member 6, nut member 7 and piston 8.

Next, the electric parking brake driving device D1 (hereinafter referred to as driving device D1, in short) for driving the parking brake actuator M will be explained with reference to FIGS. 3 through 5 of the attached drawings. It is noted here that the upper position in FIG. 3 relative to the driving device D1 is referred to as "upper" and lower position relative to the driving device D1 is referred to as "lower". The gear body 41 of the reduction gear mechanism 4 is formed by connecting a lower body 411 and an upper body 412 (corresponding to body pieces, respectively of the invention) which are integrally formed by a synthetic resin material, with a space therebetween. The space includes a predetermined volume. The gear body 41 is fixed to the brake housing 13. Enclosing wall 411a extending in a rotation axis direction is formed on the entire outer periphery of the brim portion of the lower body 411. An opposing portion 412a having an L-shape in cross section is formed on the entire outer periphery of the brim portion of the upper body 412.

When the lower body 411 and the upper body 412 are connected together, first opposing the outer periphery of the brim portions with each other to contact the enclosing wall 411a and the opposing portion 412a for positioning the two at the respective determined positions. After that, the adhesive agent is filled in the application space ("F" in FIG. 3) enclosed by the enclosing wall 411a and the opposing portion 412a. After the solidification of the adhesive agent, the entire periphery of each brim portion of the lower body 411 and the upper body 412 is connected. By using such adhesive agent, the lower body 411 and the upper body 412 are liquid tightly sealed to prevent the water invading into the gear body from outside.

Figure 3:
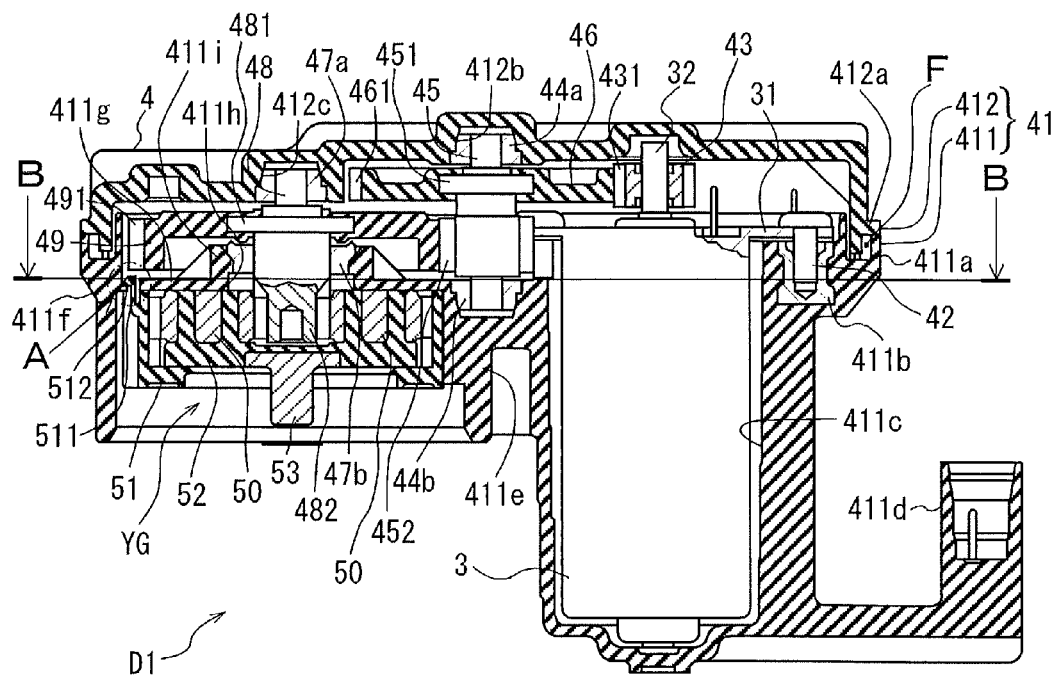
FIG. 3 is a cross sectional view illustrating an electric parking brake driving device shown in FIG. 2 to be cut in an axial direction of a first gear shaft.
Figure 4:
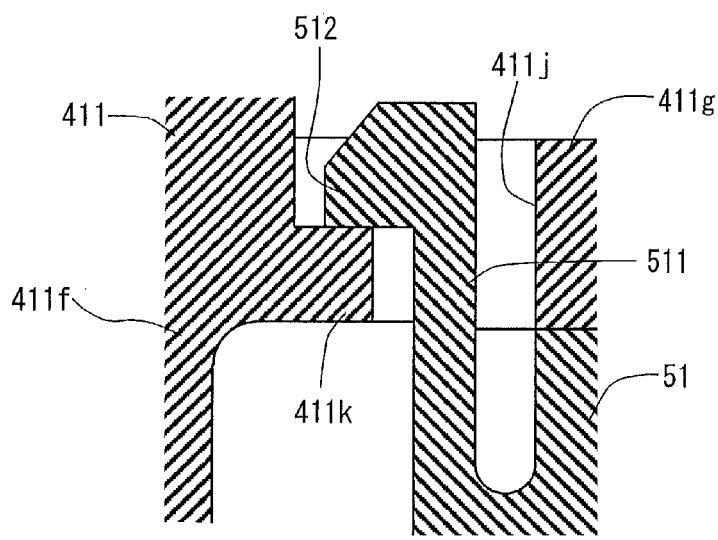
FIG. 4 is an enlarged view of "A" portion in FIG. 3

As shown in FIG. 3, the electric motor 3 is fixed to the lower body 411 by tightening a screw thread 42 which has been inserted into a flange portion 31 of the electric motor 3 to a collar member 411b which has been inserted into the lower body 411. The electric motor 3 is housed in a motor storing portion 411c formed by deeply digging down lower body 411. An electric source connector portion 411d is formed at an end portion of the lower body 411 for connecting an exterior connector (not shown). An electric power supply wire (not shown) is inserted into the lower body 411 which connects the electric source connector portion 411d with the electric motor 3. The electric motor 3 is provided with an output shaft 32 (corresponding to an output shaft of the invention) and a pinion gear 43 (corresponding to a drive gear of the invention) having inclined teeth 431 on the outer peripheral surface thereof is press-fitted in the output shaft 32.

A first upper bearing member 44a is attached to a first recessed portion 412b of the upper body 412. Further, a first lower bearing member 44b is attached to a motor wall portion 411e (corresponding to an outer wall of the invention) of the lower body 411. The first upper bearing member 44a and the first lower bearing member 44b correspond to the first bearing portion of the invention claimed. The first upper bearing member 44a and the first lower bearing member 44b are formed by a metal material and fixed to the upper body 412 or the lower body 411 by insert molding or induction welding.

A metal made first gear shaft 45 (corresponding to a first rotating shaft of the invention) is rotatably supported on the first upper bearing member 44a and the first lower bearing member 44b. A first flange portion 451 is formed at an upper portion of the first gear shaft 45 and extending in a radial direction. A first wheel gear 46 (corresponding to first driven gear of the invention) is fixed to the first flange portion 451 by insert molding. As will be explained later, the first wheel gear 46 is connected to the screw member 6 through various members.

The first wheel gear 46 is a helical gear formed by a synthetic resin material and inclined teeth 461 are provided on the outer peripheral surface thereof. The first wheel gear 46 is engaged with the inclined teeth 431 of the pinion gear 43. The diameter of the first wheel gear 46 is larger than the diameter of the pinion gear 43 and the number of the inclined teeth 461 of the first wheel gear 46 is more than the number of the inclined teeth 431 of the pinion gear 43.

A shaft gear portion 452 (corresponding to transmitting gear) is integrally formed with the first gear shaft 45 on the outer peripheral surface thereof at a lower portion. As similar to the pinion gear 43, the shaft gear portion 452 is provided with the inclined teeth and is rotated together with the first wheel gear 46. Further, a second upper bearing member 47a is provided in a second recessed portion 412c of the upper body 412. A bearing fixing surface 411g (corresponding to supporting wall of the invention) extends from an outer peripheral wall 411f (corresponding to an outer wall of the invention) of the lower body 411 and the moor outer wall portion 411e in a horizontal direction as viewed in FIG. 3. The bearing fixing surface 411g extends towards the rotation center of a later explained second gear shaft 48 and separates the planetary gear 50 from the second wheel gear 49.

Figure 5:
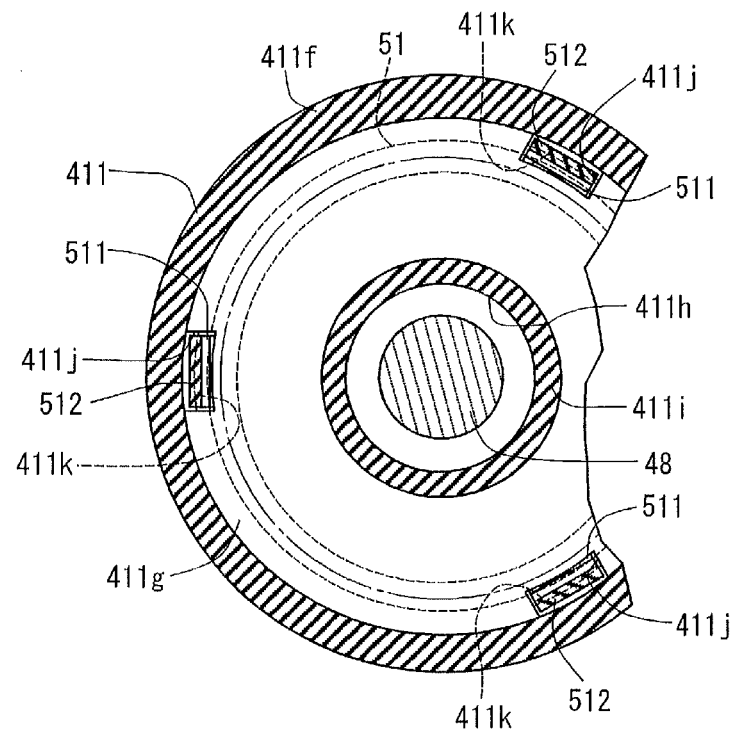
FIG. 5 is a cross sectional view cut along the line B-B in FIG. 3.

As shown in FIG. 5, an outer profile of the bearing fixing surface 411g is shaped to be of an exact circular shape and a penetrating supporting bore 411h is provided at the center thereof. A boss portion 411i is provided and is extending in up/down direction. The second lower bearing member 47b is attached to the boss portion 411i (See FIG. 3). The second upper bearing member 47a and the second lower bearing member 47b correspond to the second bearing portion of the invention and both members 47a and 47b are formed by a metal material and fixed to the upper body 412 or the lower body 411 by insert-molding or induction welding.

A metal made second gear shaft 48 (corresponding to a second rotating shaft of the invention) is rotatably supported on the second upper bearing member 47a and the second lower bearing member 47b. A second flange portion 481 is formed at an upper portion of the second gear shaft 48 and extending in a radial direction. A second wheel gear 49 (corresponding to a second driven gear of the invention) is fixed to the second flange portion 481 by insert-molding.

The second wheel gear 49 is a helical gear formed, similar to the first wheel gear 46, by a synthetic resin material and inclined teeth 491 are provided on the outer peripheral surface thereof. The second wheel gear 49 is engaged with the shaft gear portion 452 of the first gear shaft 45. The diameter of the second wheel gear 49 is larger than the diameter of the shaft gear portion 452 and the number of the inclined teeth 491 of the second wheel gear 49 is more than the number of the teeth of the shaft gear portion 452.

A sun gear portion 482 (corresponding to sun gear of the invention) is integrally formed at the lower end of the second gear shaft 48. The sun gear portion 482 is rotated together with the second wheel gear 49. A plurality of planetary gears 50 is provided around the sun gear portion 482 for engaging with the sun gear portion 482. According to this embodiment, four (4) sets of planetary gears 50 are provided (Only two are shown in FIG. 3), but the number of the planetary gears is not limited to the number of this embodiment. Each of the planetary gears 50 is formed by a metal material and rotates around the outer periphery of the sun gear portion 482 when the sun gear portion 482 rotates.

A ring gear 51 formed by a synthetic resin material is provided around the planetary gears 50. The circular shaped ring gear 51 engages with each of the planetary gears 50 at the inner peripheral surface thereof and engages with the lower body 411 as well by a snap-fitting to be prevented from rotation. As shown in FIGS. 4 and 5, three (3) insert bores 411j of approximately rectangular shape are provided at the outer brim portion of the bearing fixing surface 411g with an equal distance in a circumferential direction and penetrating therethrough. Three engaging pieces 411k are projecting radially inwardly from the outer peripheral end of the insert bores 411j.

On the other hand, a snap piece 511, which is deflectable in a radial direction, is provided at the outer peripheral surface of the ring gear 51 and extending upward as viewed in FIG. 3. A flange portion 512 is provided at the tip end portion of the snap piece 511. Three (3) snap pieces 511 are formed on the outer peripheral surface of the ring gear 51 with an equal distance in a circumferential direction.

Upon installing of the ring gear 51 to the lower body 411, ring gear 51 is moved upward within the lower body 411 so that the three snap pieces 511 are advancing in the insert bores 411j of the bearing fixing surface 411g. Each snap piece 511 inserted into the insert bore 411j is deflected in radially inward by the contact of the flange portion 512 with the engaging piece 411k. In response to the movement of the ring gear 51, after the flange portion 512 passed through the engaging piece 411k the snap piece 511 restores to the original position by deflecting radially inward so that the flange portion 512 engages with the engaging piece 411k. Thus the ring gear 51 becomes non-displaceable in a rotation axis direction to be prevented from dropping off. (See FIG. 4). When the ring gear 51 is installed to the lower body 411, the snap piece 511 positions within the insert bore 411j and the ring gear 51 is prevented from a movement in a circumferential direction. (See FIG. 5).

As explained above, the planetary gears 50 are engaged with a carrier member 52 so that the planetary gears 50 are mutually engaged with one another. The carrier member 52 is made from a synthetic resin material and is connected to an output member 53 at the lower end thereof. The output member 53 is made from a metal material and is connected to the screw member 6. Therefore, the carrier member 52 is connected to the screw member 6 through the output member 53. The planetary gear mechanism YG is formed by the sun gear portion 482, planetary gears 50, ring gear 51 and the carrier member 52. The carrier member 52 is rotated by the rotation of the planetary gears 50 and the rotation of the sun gear portion 482 is transmitted to the screw member 6 with a reduced speed.

The driving force of the electric motor 3 is reduced first by the engagement between the pinion gear 43 and the first wheel gear 46 (first stage speed reduction) and thereafter, further reduced by the engagement between the shaft gear portion 452 and the second wheel gear 49 (second stage speed reduction). Further, the driving force is reduced by the planetary gear mechanism YG (third stage speed reduction) and is transmitted to the screw member 6.

According to the embodiment, since the first gear shaft 45 is supported by the first upper bearing member 44a and the first lower bearing member 44b provided on the gear body 41, no space for supporting the first gear shaft 45 to the electric motor 3 is needed and the size of the reduction gear mechanism 4 can be minimized to prevent oversizing. Thus the manufacturing of a cost reduced electric parking brake driving device G can be achieved.

Further, the reduction gear mechanism 4 includes the pinion gear 43 fixed to the output shaft 32 of the electric motor 3 and the first wheel gear 46 having the number of teeth more than the number of teeth of the pinion gear 43, connected to the screw member 6 through the plurality of members and further being engaged with pinion gear 43. According to this structure, without using a transmitting mechanism with belt, the rotation of the electric motor 3 can be transmitted to the screw member 6 by reducing the rotation speed thereof. Even if a deviation of a position of the first gear shaft 45 relative to the electric motor 3 occurs, the driving force of the electric motor 3 can be transmitted without problems, to thereby surely park the vehicle.

Further, the reduction gear mechanism includes a shaft gear portion 452 formed on the first gear shaft 45, a second gear shaft 48 supported on the gear body 41, a second wheel gear 49 formed on the second gear shaft 48, having a plurality of gear teeth more than the number of gear teeth of the shaft gear portion 452 and engaged with the shaft gear portion 452, a sun gear portion 482 provided on the second gear shaft 48, a plurality of planetary gears 50 engaging with the sun gear portion 482 and orbiting the sun gear in response to the rotation of the sun gear portion 482, a ring gear 51 engaging with the planetary gears 50 at an inner peripheral surface, whereby the rotation of the ring gear is restricted and a carrier member 52 connecting the plurality of planetary gears 50 and connected to the screw member 6 to be rotated by an orbiting of the planetary gears 50, whereby the rotation of the sun gear portion 482 is outputted to the screw member 6 through reduction. Accordingly, the rotation speed of the motor 3 is reduced by the two-stage gear mechanism and the planetary gear mechanism YG to be able to provide an electric parking brake driving device with a small size, but having a large reduction effect.

Since the second lower bearing member 47b is formed on the bearing fixing surface 411g which extends from the outer peripheral wall 411f of the gear body 41 and the motor wall portion 411e towards the rotation center of the second gear shaft 48, the second gear shaft 48 can be supported at any desired position in an axial direction. Further, since the planetary gears 50 and the second wheel gear 49 are separated by the bearing fixing surface 411g, any undesired heat transmittal or water invasion from the first brake pad 21a side into inside of the gear body 41 can be prevented.

Second Embodiment

Figure 6:
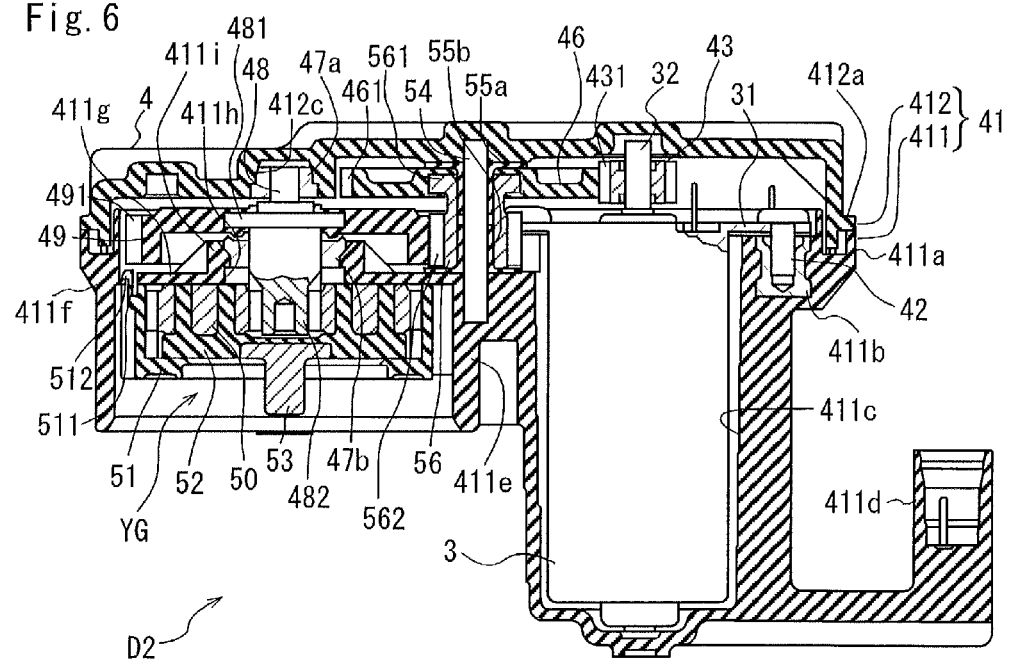
FIG. 6 is a cross sectional view of the electric parking brake driving device according to a second embodiment of the invention.

The driving device D2 according to the second embodiment will be explained based on FIG. 6 by explaining the differences in structure from the drive device D1 according to the first embodiment. It is noted here that the upward in FIG. 6 is used as an upward of the drive device D2 and the downward is used as a downward of the drive device D2. As shown in FIG. 6, a pivot pin 54 (corresponding to a first bearing portion of the invention) is used instead of the first gear shaft 45 as used in the drive device D1 of the first embodiment. The pivot pin 54 is fixed to the gear body 41 by press-fitting or by welding.

A gear member 56 is rotatably supported on the pivot pin 54 through a pair of bushes 55a and 55b. A first flange portion 561 is formed at the upward of the gear member 56 as similar to the first gear shaft 45 of the first embodiment and extending in a radial direction. Further as similar to the first embodiment, the first wheel gear 46 is fixed to the first flange portion 561 by insert-molding.

At the downward of the gear member 56, a gear portion 562 (corresponding to a transmitting gear of the invention) is integrally formed on the outer peripheral surface thereof and inclined teeth are formed on the gear portion 562 which engage with the second wheel gear 49 as similar to the structure in the first embodiment. Other components and structure of the drive device D2 are the same with those of the drive device D1 of the first embodiment and further explanation will be omitted.

According to the driving device D2 of this second embodiment, a non-rotatable pivot pin 54 is fixed to the gear body 41 instead of using the first gear shaft 45 of the driving device D1 of the first embodiment. The allowable interference of the pivot pin 54 relative to the gear body 41 in an axial direction can be reduced compared to that of the first gear shaft 45 which is a rotatable member. Accordingly, the driving device D2 can be more downsized as compared to the driving device D1 in an up/down direction.

Connecting method for connecting lower body 411 and upper body 412 according to a third embodiment will be explained hereinafter with reference to the attached drawings of FIGS. 7 through 9. In this embodiment, the lower and upper bodies 411 and 412 are formed by a synthetic resin with heat plasticity. When connecting the lower and upper bodies 411 and 412, first opposing the outer peripheral brim portions to each other, and then contacting to form an accommodation space S therebetween as shown in FIG. 8. The accommodation space S is of approximately a square shape in cross section and is extending linearly along the outer peripheral brim portions of the lower and upper bodies 411 and 412. The space S is divided into two sections on the outer peripheral brim portions.

Figure 7:
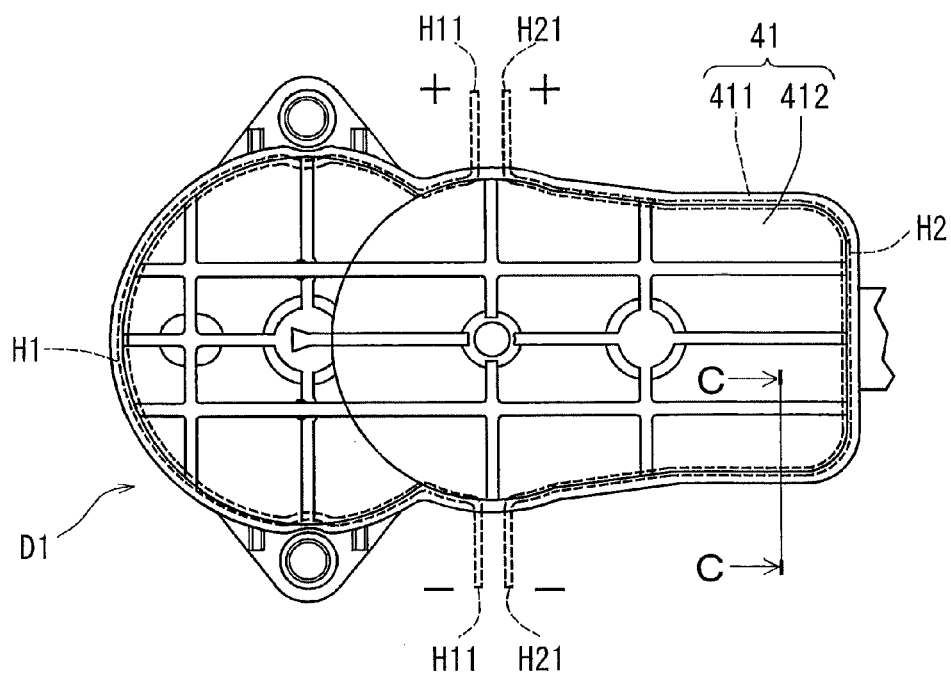
FIG. 7 is a plane view of the of the electric parking brake driving device according to a third embodiment of the invention, particularly showing how the gear body is connected.
Figure 8:
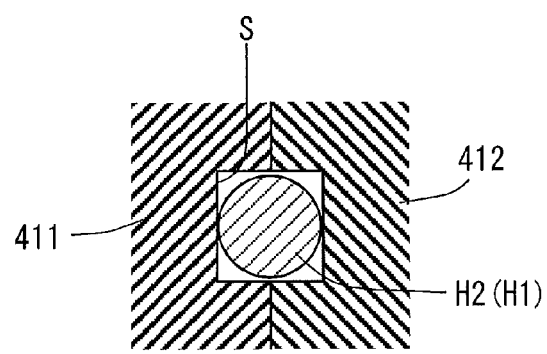
FIG. 8 is a cross sectional view cut along the line C-C in FIG. 7.
Figure 9:
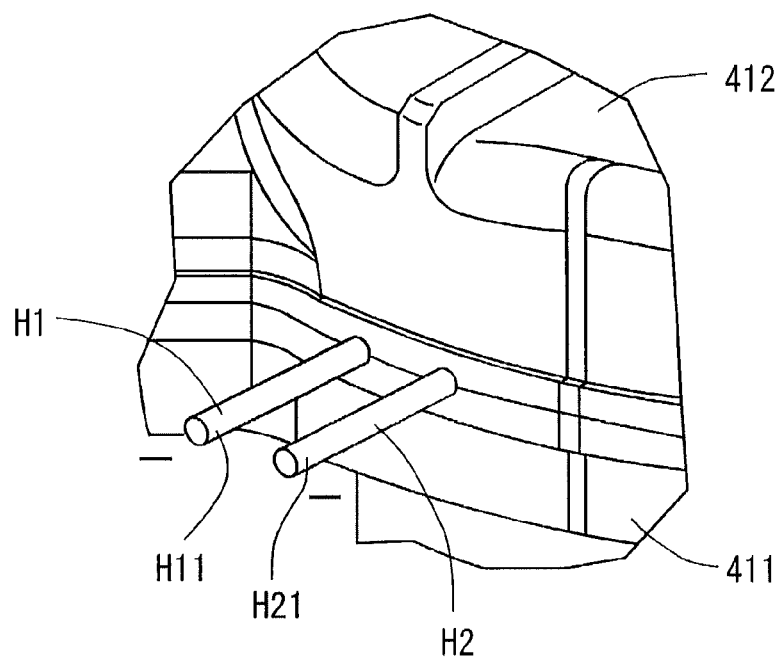
FIG. 9 is a partial perspective view of the gear body illustrated in FIG. 7.

In the respective divided sections of the space S, wire shaped heat elements H1 and H2 are provided and each one end portion H11 and H21 of the heat elements H1 and H2 is projected outward and extended to the exterior of the gear body 41 (as shown in FIGS. 7 and 9). The heat elements h1 and H2 develop heat by energizing the heat elements H1 and H2 by connecting to the DC power source. The generated heat melts the lower and upper bodies 411 and 412 and at the same time the lower and upper bodies 411 and 412 are pressurized to each other and connected together by welding the outer peripheral brims of the lower and upper bodies 411 and 412.

This connecting method is called as "Flat Fusion System" (a registered trademark) or as an inner surface welding in general. After connecting, the projected end portions H11 and H21 of the heat elements H1 and H2 are cut and removed. As explained, the lower and upper bodies 411 and 412 are fluid-tightly connected to each other to prevent invasion of external objects such as water from entering into the inside.

According to the embodiment, the outer peripheral brim portions of the lower and upper bodies 411 and 412 are mutually contacted and after disposing the linear shaped heat elements H1 and H2 therebetween, the lower and upper bodies 411 and 412 are pressurized and welded under the heat generated by the heat elements H1 and H2 through energizing thereof. Thus, the lower and upper bodies can be welded without applying any adhesion agent or within a short period of time, without necessitating waiting time for solidification of such adhesive agent.

Other Embodiments/Modifications

Figure 10:
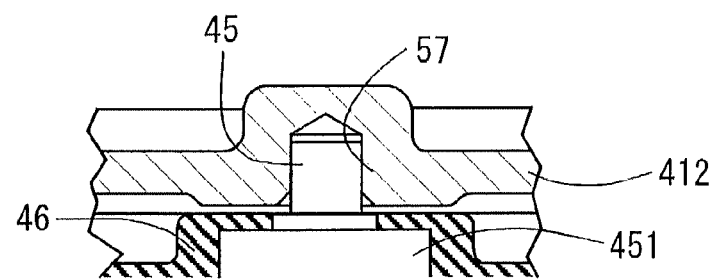
FIG. 10 is a partially enlarged view of the supporting structure of the first gear shaft according to another embodiment.

The invention is not limited to the embodiments explained above and the following embodiments or modifications are included within the scope of the invention. The lower and upper bodies 411 and 412 can be connected by using fastening screws, or by laser welding or snap fitting, as long as the connected surface is liquid-tightly connected together. Further, the lower and upper bodies 411 and 412 are made by metal material and the bearing members 44a, 44b, 47a and 47b are made by a synthetic resin material. Or as shown in FIG. 10, lower and upper bodies are formed by metal material (only the upper body 412 is shown in FIG. 10) and the bearing portion 57 is integrally formed with lower or upper body 411 or 412.

Further, the gear body 41 is formed by three or more body parts which are connected to form a gear body. Further, the gear body 41 is integrally formed with the brake housing 13. Still further, the brake type is not limited to the floating type disc brake in which the disc rotor 9 is squeezed between the claw portion 13a of the brake housing 13 and the piston 8, but the invention is applied to an opposing type disc brake in which the disc rotor 9 is pushed by the piston from both sides. The electric motor 3 may be attached to the brake housing 3 and any type of the electric motor 3 may be applicable, such as, for example, synchronous machine, induction machine or DC motor type may be used.

EXPLANATION OF REFERENCE NUMERALS

The electric parking brake driving device and the electric parking brake device according to the invention may be applicable to vehicles such as four wheel vehicle, two wheel vehicle or other vehicles.

In the drawings:
3: motor, 4: reduction gear mechanism, 6: screw member (rotating member), 7: nut member (translatory member), 8: piston, 9: disc rotor (disc), 13: brake housing, 21a: first brake pad (brake pad), 21b: second brake pad (brake pad), 32: output shaft, 41: gear body, 43: pinion gear (drive gear), 44a: first upper bearing member (first bearing portion), 44b: first lower bearing member (first bearing portion), 47a: second upper bearing member (second bearing portion), 47b: second lower bearing member (second bearing portion), 48: second gear shaft (second rotating shaft), 49: second wheel gear (second driven gear), 50: planetary gears, 51: ring gear, 52: carrier member, 54: pivot pin (first bearing portion), 57: bearing portion, 411: lower body (body piece), 411e: motor wall portion (outer wall), 411f: outer peripheral wall (outer wall), 411g: bearing fixing surface (supporting wall), 412: upper body (body piece), 452: shaft gear (transmitting gear), D1 and D2: electric parking brake driving device, H1 and H2: heat element, M: parking brake actuator, N: knuckle arm (vehicle body), P: electric parking brake device, and W: vehicle wheel.

The invention claimed is:

1. An electric parking brake driving device for driving a parking brake actuator which generates a braking force and applies the braking force to a vehicle wheel by converting a rotational movement from a rotating member into a translatory movement, transmitting the converted translatory movement to a piston and by pushing a disc rotated together with the vehicle wheel by a brake pad biased by the piston, the electric parking brake driving device comprising:
   an electric motor; and
   a reduction gear mechanism for transmitting a driving force of the electric motor to the rotating member, wherein the reduction gear mechanism includes:
   a gear body;
   a drive gear provided in the gear body and fixed to an output shaft of the electric motor;
   a first rotating shaft rotatably supported on the gear body through a first bearing portion provided on the gear body;
   a first driven gear formed on the first rotating shaft and having a plurality of gear teeth more than a number of gear teeth formed on the drive gear, whereby the first driven gear engages with the drive gear;
   a transmitting gear formed on the first rotating shaft and integrally rotating with the first driven gear;
   a second rotating shaft rotatably supported on the gear body through a second bearing portion provided on the gear body, the second rotating shaft being rotatable about an axis which extends in an axial direction;
   a second driven gear formed on the second rotating shaft and having a plurality of gear teeth more than a number of gear teeth formed on the transmitting gear, whereby the second driven gear engages with the transmitting gear;
   a sun gear provided on the second rotating shaft and integrally rotating with the second driven gear;
   a plurality of planetary gears engaged with the sun gear and orbiting around an outer periphery of the sun gear in response to the rotation of the sun gear;
   a ring gear disposed around the planetary gears and engaging therewith at an inner peripheral surface, the ring gear being non-rotatable by engaging with the gear body; and
   a carrier member connecting the plurality of planetary gears and at the same time connected to the rotating member to be rotated by the orbiting of the planetary gears, whereby a rotation of the sun gear is outputted to the rotating member through a reduction, wherein
   the second bearing portion includes a pair of second bearing members,
   the gear body includes a supporting wall which is formed integrally with an outer wall of the gear body and extends from the outer wall towards a rotation center of the second rotating shaft to separate the planetary gears from the second driven gear, the supporting wall being disposed between the second driven gear and the planetary gears relative to the axial direction,
   one of the pair of second bearing members is disposed on the supporting wall to support the second rotating shaft at one side of the second driven gear, and
   an other of the pair of second bearing members is disposed on the gear body to support the second rotating shaft at an other side of the second driven gear opposite to the one side of the second driven gear relative to the axial direction.

2. The electric parking brake driving device according to claim 1, wherein
   the gear body is formed by a pair of body pieces which is connected with each other so that a space with a predetermined volume is provided inside the gear body, and wherein
   the pair of body pieces is connected at each outer peripheral brim thereof by an adhesive agent.

3. The electric parking brake driving device according to claim 1, wherein
   the gear body is formed by a pair of body pieces which is connected with each other so that a space with a predetermined volume is provided inside the gear body,
   both of the pair of body pieces are formed by a thermoplastic synthetic resin material, and wherein
   the two body pieces are connected by contacting respective outer peripheral brim portions with each other, placing a linear shaped heating element between the respective outer peripheral brim portions and under developing heat by energizing the heating element, connecting the both body pieces by applying pressure to each other by welding.

4. An electric parking brake device comprising:

a brake housing attached to a vehicle body;

a piston attached to and displaceable relative to the brake housing;

a brake pad disposed between a disc which rotates with a vehicle wheel and the piston;

an electric motor provided to be non-displaceable relative to the brake housing;

a reduction gear mechanism for transmitting a driving force of the electric motor;

a rotating member driven by the electric motor within the brake housing through the reduction gear mechanism; and a translatory member engaging with the rotating member and being non-rotatable relative to the brake housing but displaceable in an axial a direction of the piston by the rotation of the rotating member for biasing the brake pad towards the disc through the piston, wherein the reduction gear mechanism includes:

a gear body attached to the brake housing;

a drive gear provided in the gear body and fixed to an output shaft of the electric motor;

a first rotating shaft rotatably supported on the gear body through a first bearing portion provided on the gear body;

a first driven gear formed on the first rotating shaft and having a plurality of gear teeth more than a number of gear teeth formed on the drive gear, whereby the first driven gear engages with the drive gear;

a transmitting gear formed on the first rotating shaft and integrally rotating with the first driven gear;

a second rotating shaft rotatably supported on the gear body through a second bearing portion provided on the gear body, the second rotating shaft being rotatable about an axis which extends in an axial direction;

a second driven gear formed on the second rotating shaft and having a plurality of gear teeth more than a number of gear teeth formed on the transmitting gear, whereby the second driven gear engages with the transmitting gear;

a sun gear provided on the second rotating shaft and integrally rotating with the second driven gear;

a plurality of planetary gears engaging with the sun gear and orbiting an outer periphery of the sun gear in response to the rotation of the sun gear;

a ring gear disposed around the planetary gears and engaging with the planetary gears at an inner peripheral surface, whereby the rotation of the ring gear is restricted by engaging with the gear body; and a carrier member connecting the plurality of planetary gears and connected to the rotating member to be rotated by an orbiting of the planetary gears, whereby a rotation of the sun gear is outputted to the rotating member through a reduction, wherein the second bearing portion includes a pair of second bearing members, the gear body includes a supporting wall which is formed integrally with an outer wall of the gear body and extends from the outer wall towards a rotation center of the second rotating shaft to separate the planetary gears from the second driven gear, the supporting wall being disposed between the second driven gear and the planetary gears relative to the axial direction, one of the pair of second bearing members is disposed on the supporting wall to support the second rotating shaft at one side of the second driven gear, and an other of the pair of second bearing members is disposed on the gear body to support the second rotating shaft at an other side of the second driven gear opposite to the one side of the second driven gear relative to the axial direction.

* * * * *